No. 764,239. Patented July 5, 1904.

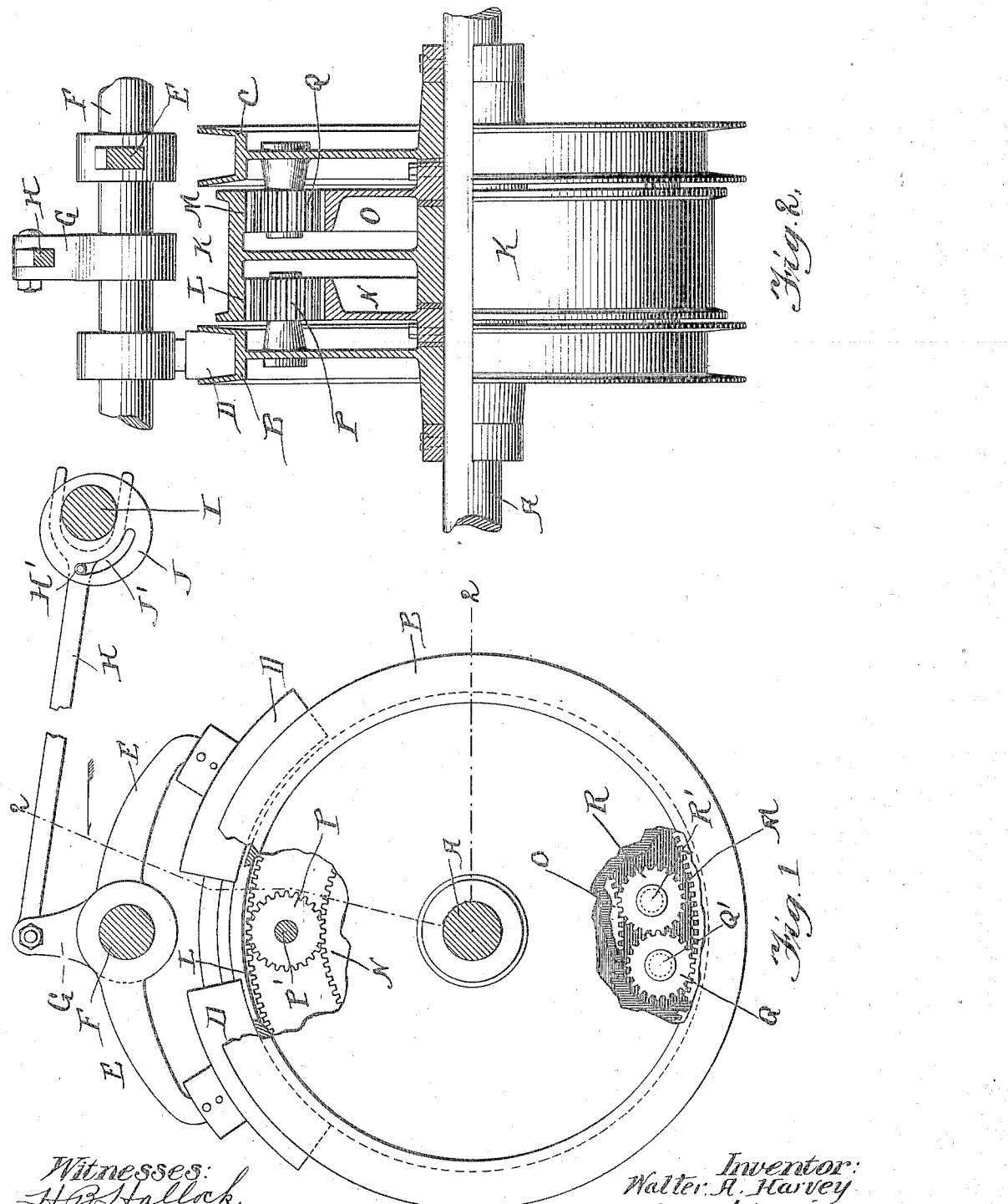

UNITED STATES PATENT OFFICE.

WALTER A. HARVEY, OF BATTLECREEK, MICHIGAN.

POWER-TRANSMISSION DEVICE.

SPECIFICATION forming part of Letters Patent No. 764,239, dated July 5, 1904.

Application filed November 18, 1903. Serial No. 181,585. (No model.)

*To all whom it may concern:*

Be it known that I, WALTER A. HARVEY, a citizen of the United States, residing at Battlecreek, county of Calhoun, and State of Michigan, have invented a certain new and useful Improvement in Power-Transmission Devices, of which the following is a specification.

My invention relates to a new and useful improvement in transmission-gears for machinery, and has for its object to provide a simple device which will be compact in form and easily operated.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 is a cross-section through the driven shaft, showing my device in elevation, portions of the same being broken away to show the gearing; Fig. 2, a section on the line 2 2 of Fig. 1.

This transmission device may be applied to any form of machinery, but is particularly applicable to printing-presses and machinery of like nature and can also be applied advantageously to motor-driven vehicles.

A represents the driven shaft, upon which are journaled loosely the friction-wheels B and C. The peripheries of these friction-wheels are preferably channeled, and in each channel of each of the wheels fits a shoe D, each shoe being secured to the outer end of an arm E and said arms being secured rigidly to a shaft F, said shaft being provided with a crank G, to which is connected one end of a rod H, and thus by pushing the rod H in one direction one of the shoes will be brought in contact with one of the friction-wheels, and by pushing the rod in the opposite direction the other shoe will be brought in frictional contact with the other friction-wheel. Any means can be employed for operating this rod H. The means shown in the drawings consists of a shaft I, which has secured to it a disk J, said disk being provided with a curved slot J', eccentric to the shaft, and a pin or roller H', secured upon the rod H, projects through the slot, the outer end of the rod H being forked and straddling the shaft I for guiding the rod H in its movements. Thereby by turning the shaft I in one direction the rod H will be pulled upon, and by turning the shaft in the opposite direction the rod will be pushed upon.

K is the driving wheel or pulley, journaled loosely upon the shaft A in between the friction-wheels. The interior of the rim of this pulley is provided with internal gear-teeth L and M upon each side.

N and O are gears secured rigidly to the shaft A in between the hubs of the friction-wheel and the hub of the pulley K. These gears, N and O are in alinement with the gear-teeth L and M upon the pulley.

P represents a series of small gears journaled upon studs P', extending inward from the friction-wheel B. These gears P are in mesh with the internal gear L upon one side and the external gear N upon the other side. Therefore if the friction-wheel B is held stationary by means of the friction-shoe the driven shaft A will be driven in an opposite direction to the driving-wheel K.

Upon the opposite side of the pulley K are arranged a series of sets of two gears each, (lettered Q and R.) All of the small gears Q and R are journaled on studs Q' and R', extending inward from the friction-wheel C. The gear Q is in mesh with the internal gear M upon the pulley and also in mesh with the gear R. Said gear R is also in mesh with the external gear O, secured to the shaft A. Thus when the friction-wheel C is held from revolving by means of its friction-shoe the shaft A will be caused to revolve in the same direction as the driving-pulley K. Thus it will be seen that by a slight rocking movement of the shaft I either friction-block may be brought in contact with the friction-wheel with which it contacts, so as to cause the driven shaft to be driven in whichever direction desired, and as both friction-blocks are connected to the same shaft one friction-block must necessarily be disengaged from its friction-wheel before the other friction-block is forced into engagement with its wheel.

This apparatus will make a very effectual brake, for if the shaft is traveling in one direction it is only necessary to bring the friction-block in contact with the proper friction-wheel with a gradual increasing pressure, which will have a tendency to reverse the mechanism and therefore will gradually slow down the machine, and as soon as the machinery is brought to a full stop then the crank G may be moved to a central position, in which case both friction-blocks will be out of engagement with the friction-wheels.

Of course I do not wish to be limited to the exact construction here shown, as slight modifications could be made without departing from the spirit of my invention.

Having thus fully described my invention, what I claim as new and useful is—

In a device of the character described, a driven shaft, friction-wheels having peripheral channels journaled loosely upon said driven shaft, a driving-wheel journaled loosely upon the driven shaft in between the friction-wheels, two external gears, one arranged upon each side of the driving-wheel and secured to the driven shaft, two internal gears formed upon the rim of the driving-wheel upon each side, a series of single gear-wheels arranged upon one side of the driving-wheel and meshing with both the external and internal gear upon that side, studs carried by the friction-wheel upon that side upon which said gear-wheels are journaled, a series of gear-wheels arranged in pairs upon the opposite side of the driving-wheel, each pair of gear-wheels meshing together, and one of each pair meshing with the internal gear on the driving-wheel and the other with the external gear secured to the shaft, studs extending inward from the friction-wheel upon that side upon which said gears are journaled, said friction-wheels being provided with annular channels formed around their periphery, a shaft, arms secured to said shaft and extending outward in opposite directions therefrom, shoes secured to the outer ends of said arms, one shoe arranged in alinement with one friction-wheel, and the other shoe arranged in alinement with the other friction-wheel and adapted to fit in the annular channel a crank secured to the shaft and a rod for moving said crank backward and forward to throw the shoes in or out of engagement with their friction-wheels, or to cause the crank to remain central so that both shoes will be out of engagement with the friction-wheels at the same time, and means for guiding the rod as and for the purpose specified.

In testimony whereof I have hereunto affixed my signature in the presence of two subscribing witnesses.

WALTER A. HARVEY.

Witnesses:
H. J. JOHNSON,
MADISON BARR.